United States Patent [19]

Maendel

[11] Patent Number: 4,512,393

[45] Date of Patent: Apr. 23, 1985

[54] HEAT EXCHANGER CORE CONSTRUCTION AND AIRFLOW CONTROL

[75] Inventor: Jonathan P. Maendel, MacGregor, Canada

[73] Assignee: Baker Colony Farms Ltd., MacGregor, Canada

[21] Appl. No.: 483,904

[22] Filed: Apr. 11, 1983

[51] Int. Cl.³ .......................... F24H 3/02; F28F 3/00
[52] U.S. Cl. ...................................... 165/54; 165/159; 165/166; 165/DIG. 8
[58] Field of Search .................. 165/54, 96, 122, 159, 165/166, DIG. 5, DIG. 12, DIG. 18, DIG. 8

[56] References Cited

U.S. PATENT DOCUMENTS

| | | | |
|---|---|---|---|
| 1,825,498 | 9/1931 | Wogan | 165/DIG. 12 |
| 1,833,166 | 11/1931 | Lucke | 165/DIG. 5 X |
| 3,495,656 | 2/1970 | Dickson | 165/166 |
| 3,757,856 | 9/1973 | Kun | 165/166 |
| 3,825,061 | 7/1974 | Bathla | 165/166 X |
| 3,907,032 | 9/1975 | De Groote et al. | 165/166 |
| 3,986,549 | 10/1976 | Huggins et al. | 165/DIG. 12 X |
| 4,149,590 | 4/1979 | Ospelt | 165/53 |

FOREIGN PATENT DOCUMENTS

| | | | |
|---|---|---|---|
| 19130 | 7/1919 | Canada | . |
| 470100 | 12/1950 | Canada | 165/DIG. 12 |
| 100648 | 9/1978 | Japan | 165/59 |
| 121399 | 9/1980 | Japan | 165/54 |

Primary Examiner—Douglas Hart
Attorney, Agent, or Firm—Stanley G. Ade

[57] ABSTRACT

A heat exchange apparatus includes a core mounted within a casing and two fans arranged to draw air from the exterior of a building through the core in a first path and to draw air from the interior of the building through the core in a second path. The core is made up from a plurality of tubular cells each formed from a single folded sheet of aluminum and having a slot shaped cross-section. The short sides of the slot are arranged to face the inlet of cold exterior air so that it impinges upon the outer surface of the short side. The fan drawing the warm air is arranged to direct air onto the other surface of the short side so that the short side and the surrounding portions of the long sides act as an effective heat exchange surface free from the seam of the tubular core which is arranged adjacent opposite the short side. A differentially perforated baffle plate spreads the cold air over core such that more cold air is directed to the warm end of the core. The amount of warm air passing through the core is arranged to be greater than the amount of cold air so as to maintain the core above frosting temperatures. The excess of air can be arranged by by-passing air to and from the interior of the building through openings in the casing.

15 Claims, 4 Drawing Figures

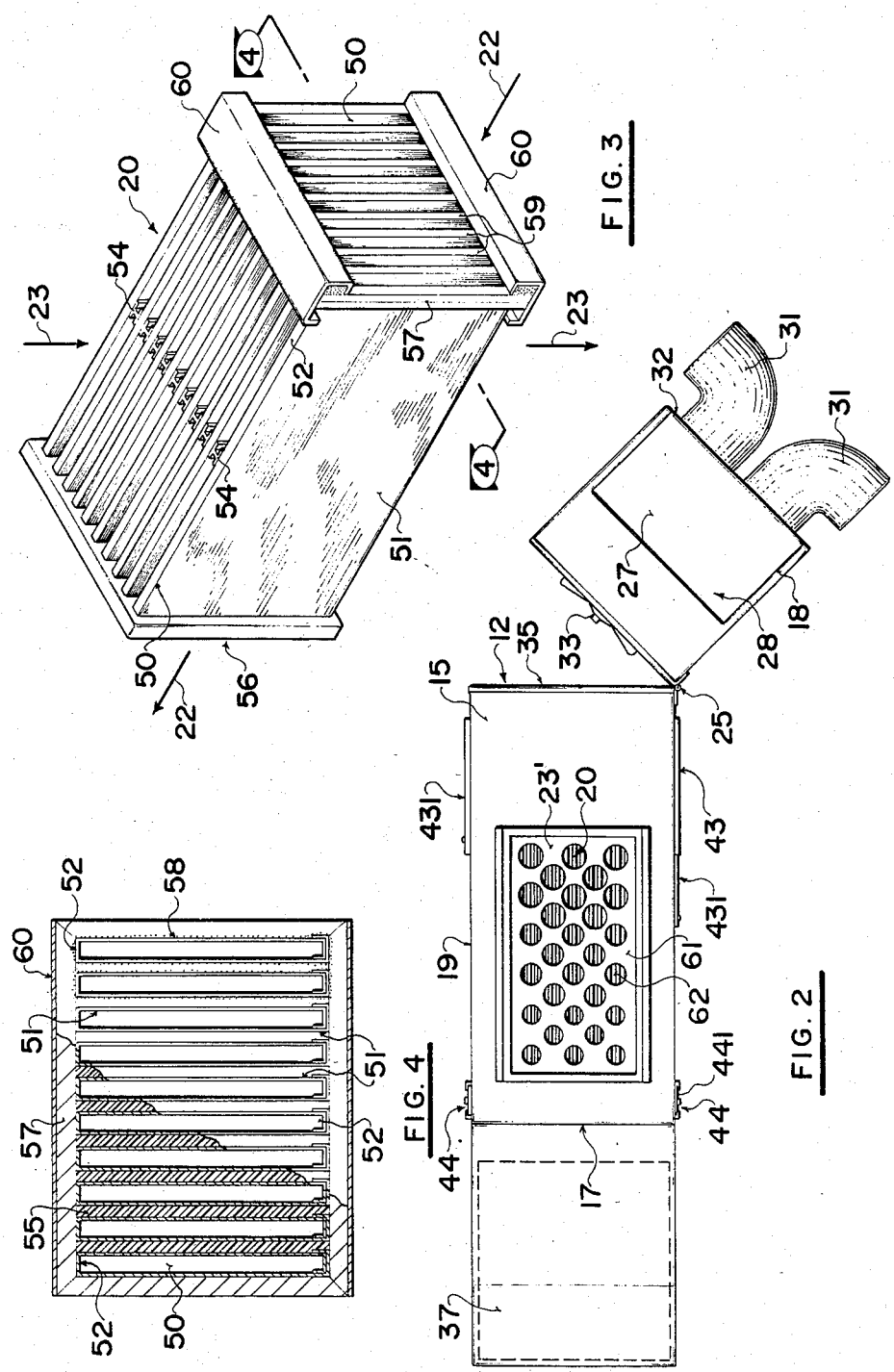

HEAT EXCHANGER CORE CONSTRUCTION AND AIRFLOW CONTROL

BACKGROUND OF THE INVENTION

This invention relates to new and useful improvements in heat exchangers, particularly heat exchangers designed for use in buildings having a very moist interior environment such as animal barns and the like. Buildings in which animals are housed in fairly large numbers often suffer from an overheated moist atmosphere and unless the temperature and humidity are rigidly controlled, disease is often prevalent. Examples are chicken raising establishments, pig barns and even cattle barns.

In relatively warm weather, control is relatively easy because the outside ambient temperature is such that free circulation can be obtained merely by opening windows and the like within the building but with an outside ambient temperature which is very cold such as in northern climates, heat exchangers have to be utilized.

Normal heat exchangers used for this purpose merely exhaust inside air through a core and draw cold outside air through opposing channels so that heat is picked up by the outside air from the exhausting air prior to the exhausting air being discharged. Due to the extremely high humidity of the exhausting warm air, a considerable amount of moisture is carried thereby and the heat exchanging core often drops the temperature of this air below the dew point thus causing the water or moisture to condense and with cold outside air passing through the heat exchanger, severe frosting often occurs. This frosting is so severe that the heat exchanger becomes inoperative unless defrosting takes place.

Conventional heat exchangers defrost by reversing the flow of air by routing the inside air through the incoming air channels. Inasmuch as this inside air is often contaminated, the channels normally carrying the fresh outside air also become contaminated. Furthermore particle deposition can take place with the subsequent reduction of cross-sectional area of channels normally carrying the clean air inwardly.

Various methods for defrosting have been proposed but all these methods add complication and inefficiency. Attempts have been made to manufacture a heat exchange apparatus of this type which is substantially free from frosting problems but to date have not met with success.

SUMMARY OF THE INVENTION

It is accordingly one object of this invention to provide a heat exchange apparatus which overcomes these disadvantages and substantially operates without the problem of frosting thus avoiding the complications necessary for regular defrosting procedures.

The invention therefore provides a heat exchange apparatus comprising an enclosure, means for mounting the enclosure in an external wall of a building, a heat exchange core mounted within the enclosure, means associated with the core dividing said enclosure into a first path for conveying outside air into the building and a second path for conveying inside air to the outside of the building, said first and second paths passing through said core in heat exchanging and air impervious relationship with one another, the core comprising a plurality of substantially rectangular cells defining the second path, each cell formed from sheet metal material and having two long sides and two short sides defining a slot shaped path therethrough and means for mounting the cells in parallel spaced relation such that the spaces therebetween define the first path substantially at right angles to the second path and such that one short side of each cell presents an end face against which the incoming outside air in the first path impinges, said one short side and adjacent portions of the long sides being formed from unitary integral sheet metal free from seams, and fan means mounted in said enclosure to move air in said paths and arranged so as to direct outside air to impinge on one face of said one short side and to direct inside air to impinge on the other face of said one short side.

It has been found by the present inventors that an important part of the heat exchange process occurs at the very first surface encountered by the cold outside air as it enters the heat exchange core. Accordingly the present invention arranges that the first surface encountered by the air is a smooth surface unencumbered by seams and spaces. In addition the warm internal air flow is arranged such that it impinges upon this first surface to ensure that it is constantly swept by the warm air and maintained at a temperature which avoids frosting.

Additionally the cells forming the core are manufactured from sheet metal with wide slots defining both pathways of the air thus providing effective heat exchange in view of the high thermal conductivity of the metal and also providing large spaces or channels which avoid the collection of dust and debris carried from the building in the extracted air stream.

The anti-frosting effect can be improved by increasing the amount of air flowing through the heat exchange core in the second path, that is the air drawn from the interior of the building, relative to the amount of air drawn into the building so that the temperature of the heat exchange core is maintained at a higher level thus reducing the possibility of frosting. In order to avoid excessive warm air being drawn out of the building, provision can be made to allow some of the warm air passing through the heat exchange core to return to the interior of the building.

The invention according to a second aspect provides a heat exchange apparatus comprising an enclosure, means for mounting the enclosure in an external wall of a building, a heat exchange core mounted within the enclosure, means associated with the core dividing said enclosure into a first path for conveying outside air into the building and a second path for conveying inside air to the outside of the building, said second path passing through the core from an inlet end at which the air is warmest to an outlet end at which the air is coldest in heat exchanging and air impervious relationship with said first path, and a perforated baffle arranged in the first path adjacent said upstream of the core to control the spread across the core of outside air entering the core and differentially perforated so as to provide a greater area of perforation adjacent said inlet end of the core than at said outlet end.

The invention according to a third aspect provides a heat exchange apparatus comprising an enclosure, means for mounting the enclosure in an external wall of a building, a heat exchange core mounted within the enclosure, means associated with the core dividing said enclosure into a first path for conveying outside air into the building and a second path for conveying inside air to the outside of the building, said second path passing through the core from an inlet end at which the air is warmest to an outlet end at which the air is coldest in heat exchanging and air impervious relationship with said first path, the core comprising a plurality of substantially rectangular tubular cells defining the second path, each cell formed from sheet metal material and having two long sides and two short sides defining a slot shaped path therethrough and means for mounting the cells in parallel spaced relation such that the spaces therebetween define the first path substantially at right angles to the second path and such that one short side of each cell presents an end face against which the incoming outside air in the first path impinges, said one short side and adjacent portions of the long side being formed from unitary integral sheet metal free from seams, and a perforated baffle arranged in the first path adjacent and upstream of said end faces of said cells to control the spread across the faces of outside air entering the core, the baffle being differentially perforated so as to provide a greater area of perforation adjacent said inlet end of the core than at said outlet end.

The invention therefore according to a fourth aspect provides a heat exchange apparatus comprising an enclosure, means for mounting the enclosure in an external wall of a building, a heat exchange core mounted within the enclosure, means associated with the core dividing said enclosure into a first path for conveying outside air into the building and a second path for conveying inside air to the outside of the building, said first and second paths passing through said core in heat exchanging and air impervious relationship with one another, and means for controlling the movement of air in said first and second paths arranged whereby the amount of air passing through said core in said second path is greater than in said first path.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is a top plan view of the heat exchanger with the air control valve door in the open position.

FIG. 3 is an isometric view of the core per se.

FIG. 4 is a cross-sectional view along the lines 4—4 of FIG. 3 showing the internal construction of the core.

In the drawings like characters of reference indicate corresponding parts in the different figures.

DETAILED DESCRIPTION

Figure 1:
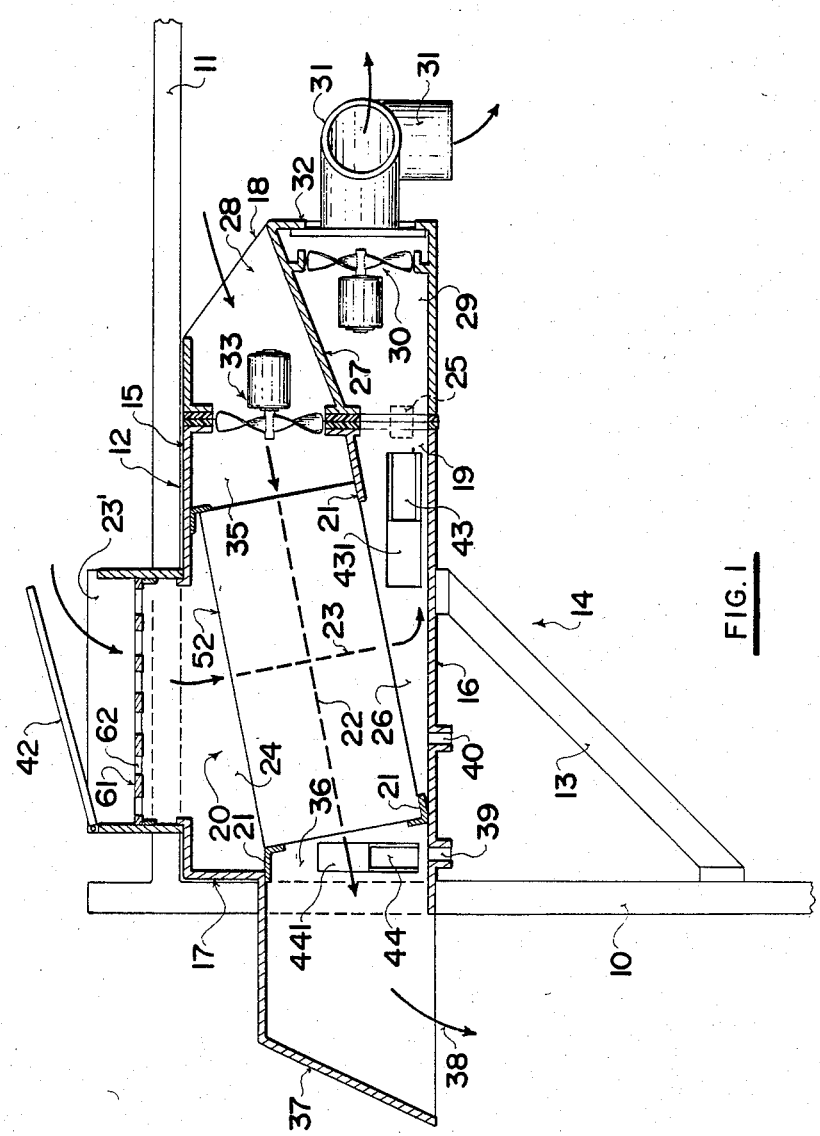
FIG. 1 is a partially schematic side elevation sectioned in part showing the heat exchanger installed through the wall of a building.

Proceeding therefore to describe the invention in detail, reference should first be made to FIG. 1 in which 10 illustrates an outside wall of a building and 11, the ceiling of the barn or building. The heat exchanger assembly collectively designated 12 is preferably situated adjacent the junction of the wall and ceiling and may be supported by means of struts 13 in a conventional manner with the major portion of the heat exchanger being situated internally of the building in the area designated by reference character 14.

The heat exchanger includes a casing having an upper side 15, a lower spaced and parallel side 16, a rear wall portion 17, a front wall portion 18 and spaced and parallel side walls 19.

A conventional heat exchanging core collectively designated 20 is supported within the enclosure by means of brackets or plates 21 at an inclined angle as shown in FIG. 1. FIGS. 3 and 4 show details of the core. The core 20, together with the supporting plates 21 divide the enclosure and the core into an outside air intake conveying system and an inside air outlet conveying system as will hereinafter be described.

The core, includes a plurality of channels extending longitudinally therethrough in the direction of arrow 22 and a plurality of further channels extending from the upper side to the lower side of the core at right angles to the first channels and indicated by reference character 23 and it should be noted that the two sets of channels constitute pathways for the movement of air at right angles to one another and in heat exchanging relationship but that the two pathways are air impervious to one another so that no actual mixing of the air occurs.

The pathway defined by the channels in the direction of arrow 23 constitutes a first path through the core and the pathway through the other channels in the direction of arrow 22 constitutes a second path through the core.

An outside air intake 23' is situated in the upper side 15 of the enclosure and communicates with an area 24 defined by the upper side of the core, the support plate 21 and part of the upper wall 15 and this area communicates directly with the upper side of the first path 23 but is completely isolated from the second path 22 of the core.

The lower side of the core extends between the lower wall 16 and a further support plate 21. Together with the base of the core, the base 16 and the further plate 21 define an area 26 which is also completely sealed off from the second path 22. The areas 24 and 26 and the first path 23 through the core constitute the aforementioned outside air intake conveying system.

The front wall 18 of the casing is preferably hinged vertically on one side as at 25 so that it may be swung open for cleaning and maintenance as shown in FIG. 2. This front portion includes an inclined divider 27 thus dividing the front portion into an air discharge section 28 and an air intake section 29 and the area 26 below the core communicates with this air intake section 29 and constitutes part of the outside air intake conveying system hereinbefore mentioned. A fan assembly 30 is mounted within the section 29 and adjustable air discharge spouts 31 extend from the front wall 32 of this section as clearly shown in FIGS. 1 and 2.

The area 28 of the front section 18 includes a further fan assembly 33 drawing air through the open front end 34 of the section 28 and discharging same into an area 35 in the front of the casing above the support plate 21 and the upper wall 15 and through the path 22 of the core 20. It passes through the core and into a rear area 36 below the upper and lower plates 21 and the wall 10 whereupon it passes through a discharge hood 37 situated exteriorly of the building on the outer surface of the wall 10 and discharges downwardly to the outside air in the direction of arrow 38.

Outside air at ambient temperature is drawn in through the intake 23', through the core along the first path 23 and is discharged via ducts 31 to the interior of the building, the movement of air being controlled by fan 30.

At the same time, fan 33 draws warm moist air from the building through the second path of the core 20 and discharges same exteriorly of the building through the hood 37.

An opening 43 is provided in the casing communicating with the section 26. The purpose of the opening is fully described in our co-pending application Ser. No. 464,756, filed Feb. 7, 1983. The opening 43 is covered by a readily adjustable door 431 (shown in partly open position) so that the area of opening communicating the area 26 to the interior of the building can be varied depending upon requirements. In this way the amount of air drawn through the heat exchange core 20 by the fan 30 can be reduced and replaced by air recirculated from the interior of the building.

In addition a further similar opening 44 is provided in the area 36 communicating the area 36 selectively to the interior of the building. Similarly the opening 44 can be selectively covered by a door 441. The opening 44 allows an adjustable proportion of the air passing through the core 20 from the interior of the building to be recirculated back into the interior of the building rather than exit through the nozzle 37. Such recirculated air is cooled by the block 20 and hence a portion of the moisture contained in the air will have been condensed out and deposited in the core for ejection through a nozzle 39.

Turning now to the details of the heat exchange core 20, this is shown in detail in FIGS. 3 and 4 and comprises a plurality of separate cells 50, each formed from a single aluminum sheet folded to form a tubular conduit of slot shaped cross-section defined by two long sides 51 and two short sides 52. The seam or overlapping section in the folded sheet is arranged at the bottom of the cell remote from the air inlet 23'. The length of the cell 50 from one end to the other end defines the length of the block 20 in regard to the path 22 and the width of the sides 51 transverse to the path 22 defines the length of the core 20 relative to the path 23.

The number of cells contained in the block can vary in accordance with the air flow required. Each cell 50 is separated from the next cell by three spacers, a central spacer 54 is shown in FIG. 3 and two end spacers 55 one of which is shown in cross section in FIG. 4. The end spacers 55 are secured in position by a resilient set material which bonds the spacer into position and provides air sealing around the ends of the tubular cells 50. A casing 56, 57 is wrapped around the outside of the core at respective ends so as to clamp the cells together to form the core. The resilient set material is indicated at 58 in FIG. 4.

The end of the core 20 adjacent the fan 33 onto which air in the path 22 is directed is provided with sheet metal covers 59 and 60. The covers 59 comprise U-shaped members extending over the spacers 55 so that each cover 59 extends from the interior of one tubular cell 50 to the interior of the next adjacent cell 50 in close contact with the adjacent walls of the two cells so as to bridge the gap and direct air smoothly into one or other of the cells. Two covers 60 are provided across the top and the bottom of the core adjacent the fan 33 to provide smooth clean lines covering the casing 57 and resilient material 58 and directing air properly into the cells 50. The covers 59 and 60 act to prevent the accumulation of dirt and other debris carried from the interior of the building by the fan 33.

It will be noted that the sides 52 of the tubular cells 50 remote from the seam are presented forwardly toward the flow of air in the path 23 from the inlet 23'. That is, the cold air coming from the exterior of the building first encounters the transverse surfaces provided by the sides 52 and impinges thereon. In addition the warm air from the interior of the building forwarded by the fan 33 is directed into the core along the tubular cells 50 at an angle thereto so as to impinge upon the other face of the sides 52. It will be noted from FIG. 1 particularly that the fan blades of the fan 33 are substantially vertical whereas the upper surfaces 52 lies at an angle to the horizontal so that the air transported in a substantially horizontal direction by the fan 33 impinges upon the surfaces 52 at an angle thereto. Thus the face of the surfaces 52 remote from the cold inlet air is swept by the warm interior air continually so as to maintain the surface 52 at a sufficient temperature to avoid frosting. This applies also to the upper portions of the surfaces 51 which are also free from the seam and hence effective heat exchangers. It will be noted also that only a single sheet of metal separates the incoming cold air from the outgoing warm air and thus heat exchange is effective and rapid in view of the high thermal conductivity of the metal.

Furthermore, in order to ensure that frosting does not occur during normally expected temperature ranges, the apparatus can be organized so that a greater volume of air is passed through the core 20 along the path 22 than along the path 23. For this purpose it will be noted that the area of the tubular cells is greater than the area between the cells thus providing a greater total area for the path 22 than for the path 23. In addition the fan 33 is preferably of a greater fan blade diameter than the fan 30 so that it acts to propel a larger volume of air. Furthermore the volume of air passing through the core along the paths 22 and 23 can be modified by opening and closing the openings 43 and 44. Finally the amount of air drawn along the path 23 by the fan 30 can be reduced by partially closing a door 42 to vary the inlet opening 23'. In practice it is preferred that the volume of air passing along the path 22 is of the order of twice the volume of air passing along the path 23.

In order to prevent excess air being drawn out of the building thus reducing the static pressure within the building to a level where the fan 33 is unable to draw the full volume of air, the openings 43 and 44 can be adjusted. Specifically uncovering the opening 43 acts to reduce the amount of air drawn through the core 23 by the fan 30. Uncovering the opening 44 acts to return some of the air passing along the path 22 back to the interior of the room. In this way the heat exchanger itself can be adjusted to control the volume of air passing along the paths 22 and 23 such that the former is of the order of twice the latter while drawing the same amount of air through the inlet 23' as it is ejected through the nozzle 37. Of course a compensation for the temperature difference must be taken into account in any calculations since this will affect the instantaneous volume of any particular quantity of air.

Alternatively the heat exchanger may be adjusted to pump a greater volume of air from the interior of the building than it draws into the building with the balancing amount of air being drawn into the building from other ventilation sources without any attempt to heat the air as it is drawn in.

Referring again to FIG. 2, immediately upstream of the core 20 in the path of the outside air entering from the inlet 23' is provided a baffle plate 61 including a plurality of holes 62 through which the air passes in its movement to the front face of the core 20. The holes at the right-hand end of the baffle plate 61 are of a larger diameter than those at the left-hand end such that the holes are gradated from 1.5 inch diameter down to 1.0 inch diameter in three or more zones. This increased proportion of hole area per unit area at the right-hand end of the core insures that the air is distributed across the face of the core with more of the cold air going to the warmer end of the core adjacent the warm air inlet than goes to the colder end of the core adjacent the warm air outlet. The ratio of the total hole area to the total area of the plate is of the order of 1 to 4 and this has been found to provide suitable distribution of the air across the core face.

It will be appreciated that the distribution of air provided by the baffle 61 assists in the avoidance of icing since less air is directed to the cold end of the core where icing is most likely to occur. The hole sizes stated are only one example and in practice the variation in hole size is calculated in accordance with measured temperature drop across the heat exchange core from the warm air inlet to the warm air outlet. In an alternative arrangement (not shown) the increased proportion of perforation at the right hand end can be provided by increasing the number of holes rather than increasing the diameter of the holes.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Heat exchange apparatus comprising an enclosure, means for mounting the enclosure relative to an external wall of the building for communication with air outside and inside of the building, a heat exchange core mounted within the enclosure, means associated with the core dividing said enclosure into a first path for conveying outside air into the building and a second path or conveying inside air to the outside of the building, said first and second paths passing through said core in heat exchanging and air impervious relationship with one another, the core comprising a plurality of substantially rectangular cells defining the second path, each cell formed from sheet metal material and having two long sides and two short sides defining a slot shaped path therethrough and means for mounting the cells in parallel spaced relation such that the spaces therebetween define the first path substantially at right angles to the second path and such that one short side of each cell presents an end face against which the incoming outside air in the first path impinges, each cell being formed from a single sheet folded such that the seam completing the cell is arranged adjacent the other short side whereby said one short side and adjacent portions of the long sides are formed from unitary integral sheet metal free from seams, fan means mounted in said enclosure to move air in said paths and arranged so as to direct outside air to impinge on one face of said one short side and to direct inside air to impinge on the other face of said one short side said cell mounting means comprising a plurality of spacers arranged at the ends of the cells and set in position by a resilient settable material whereby the air in the first path contacts the outside walls of the cells and is divided from the air in the second path only by the thickness of the cell walls and casing means wrapped around the cells only at the ends thereof to bind the cells to form the core.

2. Apparatus according to claim 1 including guide means to direct inside air onto said other face of said one short side at an acute angle thereto.

3. Apparatus according to claim 1 including fan means and means mounting said fan means at a position to move inside air directly from said fan means onto said other face.

4. Apparatus according to claim 1 wherein the cells are formed from aluminum sheet material.

5. Apparatus according to claim 1 including U-shaped metal end caps each arranged to bridge the space between adjacent cells and extending from the interior of one cell to the interior of the next adjacent cell, the end caps being arranged at the end of the cells adjacent the inside air intake so as to present a smooth surface to said inside air and to direct said inside air into the cells.

6. Apparatus according to claim 1 wherein the cross-sectional area of each cell is greater than the cross-sectional area of the space between the cell and the next adjacent cell.

7. Apparatus according to claim 1 arranged such that greater volume of air is transported in said second path than is transported in said first path.

8. Apparatus according to claim 7 wherein fan means transporting air in said second path is larger than fan means transporting air in said first path.

9. Apparatus according to claim 7 including by-pass means for allowing air in said second path downstream of said core to return to the interior of the building.

10. Apparatus according to claim 1 wherein the casing adjacent the intake for the inside air of the second path includes a sheet metal cover so as to present smooth surfaces to the inside air.

11. Apparatus according to claim 1 wherein said second path passes through the core from an inlet end at which the air is warmest to an outlet end at which the air is coldest and wherein there is provided a perforated baffle arranged in the first path adjacent to and upstream of the core to control the spread across the core of outside air entering the core and differentially perforated so as to provide a greater area of perforation adjacent said inlet end of the core than at said outlet end.

12. Apparatus according to claim 11 wherein the ratio of perforated area per unit area at said inlet end to that at said outlet end is of the order of three to two.

13. Apparatus according to claim 11 wherein the transverse dimension of the holes lies in the approximate range 1 inch to 1.5 inches.

14. Heat exchange apparatus comprising an enclosure, means for mounting the enclosure relative to an external wall of a building, for communication with air outside and inside of the building a heat exchange core mounted within the enclosure, means associated with the core dividing said enclosure into a first path for conveying outside air into the building and a second path for conveying inside air to the outside of the building, said second path passing through the core from an inlet end at which the air is warmest to an outlet end at which the air is coldest in heat exchanging and air impervious relationship with said first path, and a perforated baffle arranged in the first path adjacent to and upstream of the core to control the spread across the core of outside air entering the core and differentially perforated so as to provide a greater area of perforation adjacent said inlet end of the core than at said outlet end.

15. Heat exchange apparatus comprising an enclosure, means for mounting the enclosure relative to an external wall of a building, for communication with air outside and inside of the building a heat exchange core mounted within the enclosure, means associated with the core dividing said enclosure into a first path for conveying outside air into the building and a second path for conveying inside air to the outside of the building, said second path passing through the core from an inlet end at which the air is warmest to an outlet end at which the air is coldest in heat exchanging and air impervious relationship with said first path, the core comprising a plurality of substantially rectangular tubular cells defining the second path, each cell formed from sheet metal material and having two long sides and two short sides defining a slot shaped path therethrough and means for mounting the cells in parallel spaced relation such that the spaces therebetween define the first path substantially at right angles to the second path and such that one short side of each cell presents an end face against which the incoming outside air in the first path impinges, said one short side and adjacent portions of the long side being formed from unitary integral sheet metal free from seams, and a perforated baffle arranged in the first path adjacent and upstream of said end faces of said cells to control the spread across the faces of outside air entering the core, the baffle being differentially perforated so as to provide a greater area of perforation adjacent said inlet end of the core than at said outlet end.

* * * * *